US00RE42733E

(19) United States
(12) Reissued Patent
Gano et al.

(10) Patent Number: US RE42,733 E
(45) Date of Reissued Patent: Sep. 27, 2011

(54) WEAR-RESISTANT, VARIABLE DIAMETER EXPANSION TOOL AND EXPANSION METHODS

(75) Inventors: John C. Gano, Carrollton, TX (US); Kenneth L. Schwendemann, Flower Mound, TX (US); Darrin N. Towers, Carrollton, TX (US); Ralph Harvey Echols, Plano, TX (US); Perry Carter Shy, Southlake, TX (US)

(73) Assignee: Halliburton Energy Services, Inc., Houston, TX (US)

(21) Appl. No.: 11/408,271

(22) Filed: Apr. 20, 2006

Related U.S. Patent Documents

Reissue of:
(64) Patent No.: 6,722,427
Issued: Apr. 20, 2004
Appl. No.: 10/047,628
Filed: Oct. 23, 2001

(51) Int. Cl.
*E21B 43/10* (2006.01)

(52) U.S. Cl. ..... 166/217; 166/250.01; 166/207; 166/380

(58) Field of Classification Search ..... 166/206, 166/207, 380, 217, 277, 250.01
See application file for complete search history.

(56) References Cited

U.S. PATENT DOCUMENTS

| | | | | |
|---|---|---|---|---|
| 1,336,738 | A | | 4/1920 | Fletcher |
| 2,011,036 | A | * | 8/1935 | Colmerauer ..... 72/119 |
| 2,214,226 | A | | 9/1940 | English |
| 2,812,025 | A | | 11/1957 | Teague et al. |
| 3,195,646 | A | | 7/1965 | Brown |
| 3,203,451 | A | | 8/1965 | Vincent |
| 3,477,506 | A | | 11/1969 | Malone |
| 3,785,193 | A | | 1/1974 | Kinley et al. |
| 3,818,734 | A | * | 6/1974 | Bateman ..... 72/75 |
| 3,934,836 | A | | 1/1976 | Dunlap et al. |
| 3,940,227 | A | | 2/1976 | Strasser |
| 4,201,364 | A | | 5/1980 | Taylor |
| 4,210,991 | A | | 7/1980 | Cooper, Jr. |
| 4,212,186 | A | | 7/1980 | Blattler |
| 4,285,407 | A | * | 8/1981 | Samford ..... 175/323 |
| 4,415,029 | A | | 11/1983 | Pratt et al. |
| 4,629,991 | A | | 12/1986 | Wheeler |
| 4,754,543 | A | | 7/1988 | Spivy |

(Continued)

FOREIGN PATENT DOCUMENTS

| | | |
|---|---|---|
| WO | WO 01/18353 A1 | 3/2001 |

(Continued)

*Primary Examiner* — Shane Bomar
*Assistant Examiner* — Brad Harcourt
(74) *Attorney, Agent, or Firm* — Joshua A. Griswold

(57) ABSTRACT

The inventions provide apparatus and methods for radially expanding a tubular deployed in a subterranean well by moving an expansion tool axially through the well. An expansion tool apparatus may have wear faces attached to at least a portion of the outer periphery of a mandrel for contacting the interior surface of the pipe, tube, or screen during expansion. According to another aspect of the invention, an expansion tool has a controlled egress seal between the outer surface of the tool and the inside surface of the expandable tubular. According to another aspect of the invention, an automatically variable diameter expansion tool is provided having a variable diameter cone, which expands, and contracts based on input from one or more sensors. According to another aspect of the invention, an apparatus and method for expanding a length of screen assembly in a subterranean wellbore is provided.

107 Claims, 5 Drawing Sheets

U.S. PATENT DOCUMENTS 5,070,940 A 12/1991 Conner et al.
5,070,941 A 12/1991 Kilgore
5,083,608 A 1/1992 Abdrakhmanov et al.
5,112,158 A 5/1992 McConnell
5,264,162 A 11/1993 Salem et al.
5,325,923 A 7/1994 Surjaatmadja et al.
5,327,765 A 7/1994 Weykamp et al.
5,352,526 A * 10/1994 Solanki et al. ..... 428/422
5,366,012 A 11/1994 Lohbeck
5,392,626 A 2/1995 Blezard et al.
5,396,957 A 3/1995 Surjaatmadja et al.
5,479,699 A 1/1996 Snyder
5,613,557 A 3/1997 Blount et al.
5,640,879 A 6/1997 Damsohn et al.
5,667,011 A 9/1997 Gill et al.
5,746,557 A 5/1998 Kaibach
5,752,311 A 5/1998 Snyder
5,785,120 A 7/1998 Smalley et al.
5,823,031 A 10/1998 Campbell et al.
5,887,476 A 3/1999 Damsohn et al.
5,901,789 A 5/1999 Donnelly et al.
6,012,522 A 1/2000 Donnelly et al.
6,012,523 A 1/2000 Campbell et al.
6,021,850 A 2/2000 Wood et al.
6,029,748 A 2/2000 Forsyth et al.
6,135,208 A 10/2000 Gano et al.
6,189,616 B1 2/2001 Gano et al.
6,189,631 B1 2/2001 Sheshtawy
6,263,966 B1 7/2001 Haut et al.
6,325,148 B1 12/2001 Trahan et al.
6,328,113 B1 12/2001 Cook
6,334,351 B1 1/2002 Tsuchiya
6,412,565 B1 7/2002 Castano-Mears
6,415,509 B1 7/2002 Echols et al.
6,450,261 B1 9/2002 Baugh
6,457,518 B1 10/2002 Castano-Mears et al.
6,457,533 B1 10/2002 Metcalfe
6,478,091 B1 11/2002 Gano
6,478,092 B2 11/2002 Voll et al.
6,530,574 B1 3/2003 Bailey et al.
6,543,545 B1 4/2003 Chatterji et al.
6,561,271 B2 5/2003 Baugh et al.
6,598,677 B1 7/2003 Baugh et al.
6,631,765 B2 10/2003 Baugh et al.
6,634,431 B2 10/2003 Cook et al.
6,648,075 B2 11/2003 Badrak et al.
6,648,076 B2 11/2003 Broome
6,688,397 B2 * 2/2004 McClurkin et al. ..... 166/380
6,712,154 B2 3/2004 Cook et al.
6,719,064 B2 4/2004 Price-Smith et al.
6,722,427 B2 * 4/2004 Gano et al. ..... 166/217
6,722,433 B2 4/2004 Brothers et al.
6,725,918 B2 4/2004 Gano
6,725,934 B2 4/2004 Coronado et al.
6,745,845 B2 6/2004 Cook et al.
6,766,862 B2 7/2004 Chatterji et al.
6,857,486 B2 * 2/2005 Chitwood et al. ..... 175/104
7,048,067 B1 * 5/2006 Cook et al. ..... 166/380
7,182,141 B2 * 2/2007 Tran et al. ..... 166/384
7,234,532 B2 * 6/2007 Metcalfe et al. ..... 166/384
2001/0045289 A1 11/2001 Cook et al.
2001/0047866 A1 12/2001 Cook et al.
2001/0047870 A1 12/2001 Cook et al.
2002/0020524 A1 2/2002 Gano
2002/0040787 A1 4/2002 Cook et al.
2002/0046840 A1 4/2002 Schetky et al.
2002/0050360 A1 5/2002 Cook et al.
2002/0060068 A1 5/2002 Cook et al.
2002/0060069 A1 5/2002 Cook et al.
2002/0060078 A1 5/2002 Cook et al.
2002/0074130 A1 6/2002 Cook et al.
2002/0074134 A1 6/2002 Cook et al.
2002/0079101 A1 6/2002 Baugh et al.
2002/0084078 A1 7/2002 Cook et al.
2002/0092648 A1 7/2002 Johnson et al.
2002/0092657 A1 7/2002 Cook et al.
2002/0092658 A1 7/2002 Johnson et al.
2002/0108756 A1 8/2002 Harrall et al.
2002/0121372 A1 9/2002 Cook et al.
2002/0129935 A1 9/2002 Castano-Mears et al.
2002/0139540 A1 10/2002 Lauritzen
2002/0148612 A1 10/2002 Cook et al.
2003/0047320 A1 3/2003 Badrak et al.
2003/0111234 A1 * 6/2003 McClurkin et al. ..... 166/384
2003/0116328 A1 6/2003 Doane et al.
2003/0141079 A1 7/2003 Doane et al.
2003/0146003 A1 8/2003 Duggan et al.
2003/0205386 A1 11/2003 Johnston et al.
2003/0234102 A1 12/2003 Brothers et al.
2004/0065446 A1 * 4/2004 Tran et al. ..... 166/384
2004/0244982 A1 * 12/2004 Chitwood et al. ..... 166/347
2005/0016738 A1 * 1/2005 Metcalfe et al. ..... 166/380
2006/0272826 A1 * 12/2006 Shuster et al. ..... 166/380
2007/0084637 A1 * 4/2007 Orban et al. ..... 175/53
2007/0256829 A9 * 11/2007 Hosie et al. ..... 166/250.01

FOREIGN PATENT DOCUMENTS

WO WO 02/28560 A2 4/2002
WO WO 02/059452 A1 8/2002
WO 03029609 A1 4/2003

* cited by examiner

WEAR-RESISTANT, VARIABLE DIAMETER EXPANSION TOOL AND EXPANSION METHODS

Matter enclosed in heavy brackets [ ] appears in the original patent but forms no part of this reissue specification; matter printed in italics indicates the additions made by reissue.

TECHNICAL FIELD

The present inventions relate to improved apparatus and methods for using radially expandable sand-control screen assemblies in a subterranean oil or gas well.

BACKGROUND OF THE INVENTIONS

The control of the movement of sand and gravel into a wellbore has been the subject of much attention in the oil production industry. The introduction of sand or gravel into the wellbore commonly occurs under certain well conditions. The introduction of these materials into the well commonly causes problems including plugged formations or well tubing and erosion of tubing and equipment. There have therefore been numerous attempts to prevent the introduction of sand and gravel into the production stream.

One method of sand-control is the use of sand-control screen jackets to exclude sand from the production stream. The use of a radially expandable sand-control screen jacket includes causing the radial expansion of a screen jacket, and often base pipe, usually by drawing a mechanical expansion tool through the screen. There are several problems attendant with the apparatus and methods known in the art, some of which are enumerated below.

Expansion tools are typically in the form of a rigid mandrel introduced into the tubular to be expanded. The mandrel is dragged or pushed through the tubular, causing radial expansion by the application of brute force. The tubular itself is typically a corrosion resistant and structurally strong assembly of metal alloy. As a result, the expansion tool is subject to significant wear due to friction. There is therefore a need for a wear-resistant expansion tool.

Many expansion tools known in the art are of a fixed diameter. Commonly, the fixed-diameter expansion tool is introduced into the wellbore and positioned downhole, below the targeted production zone of the formation. The expandable tubular is then positioned adjacent to the targeted production zone, above the expansion tool, which is then drawn through the tubular to cause radial expansion. In such an operation, the fixed diameter of the expansion tool is required to be approximately equal to the desired size of the expanded tubular. This requirement often presents difficulties in positioning the tool. A few radially expandable expansion tools are known in the art, designed for introduction into the wellbore in a contracted state, then expanded for use. However, these attempted solutions are not completely satisfactory in structure having disadvantages in terms of manufacturing and operational complexity and strength. There is therefore a need for a new flexible expansion tool improving upon the art.

Further problems characteristic of downhole tubular expansion known in the art include: tearing of the tubular from over-expansion; under-expansion resulting in lack of contact between the expanded tubular and the wall of the borehole; and/or packing materials; and the expansion tool becoming lodged in the borehole. A related problem inherent in known apparatus and methods lies in lack of knowledge concerning whether over-expansion or under-expansion have occurred, necessitating additional trips downhole. Thus, there is a need for expansion tools and methods providing data-gathering and adjustable expansion capabilities according to downhole conditions.

In addition to the problems with mandrel surface wear mentioned above, there inheres the problem of seal wear. Commonly, a relatively fluid-tight seal is provided between an expansion tool and expandable tubular. Typically, such seals are made from an elastomeric material and/or mechanical seal elements, and are subject to wear due to contact with the expandable tubular. There is therefore a need for an expansion tool having a seal with wear-resistant properties.

Often the walls of a wellbore can become packed or "skinned" during drilling. Flow resistance at the wall of the hole, or "skin factor" must often be reduced before a sand-control screen assembly is installed in the formation. It is known in the art to reduce skin factor by washing the wellbore with a fluid selected for well and formation conditions. The washing is typically performed in a trip downhole separate from the one or more trips needed for installing and expanding a screen jacket assembly. Each trip downhole requires additional time and expense. There is a need to provide for washing of the borehole ahead of the expanding tubular during an expansion procedure.

Downhole tubular expansion systems known in the art often require one or more surface connections to facilitate powering or controlling expansion apparatus or methods. Surface connections often pose problems associated with the need to pass restrictions in borehole diameter or direction. There is therefore a need for downhole expansion tools and methods requiring no physical connection to the surface.

SUMMARY OF THE INVENTIONS

In general, the inventions provide apparatus and methods for radially expanding a pipe, tube, screen, or screen assembly deployed in a subterranean well by moving an expansion tool axially through the well.

According to the apparatus and methods of the invention, an expansion tool apparatus may have one or more one wear faces attached to at least a portion of the outer periphery of a mandrel for contacting the interior surface of the pipe, tube, or screen during expansion. The one or more wear faces may be chemically or mechanically bonded to the mandrel and may be inlaid in one or more niches in the outer periphery of the mandrel. The wear faces may be made up of one or more rings bonded to, or floatingly attached to the mandrel.

According to another aspect of the invention, an expansion tool has a controlled egress seal between the outer surface of the tool and the inside surface of the expandable tubular.

According to another aspect of the invention, an automatically variable diameter expansion tool is provided having a variable diameter cone, which expands, and contracts based on input from one or more sensors. The sensors measure parameters in the wellbore, such as contact pressure between the tubular and the cone.

According to another aspect of the invention, an apparatus and method for expanding a length of screen assembly in a subterranean wellbore is provided.

BRIEF DESCRIPTION OF THE DRAWINGS

The accompanying drawings are incorporated into and form a part of the specification to illustrate several examples of the present inventions. These drawings together with the description serve to explain the principals of the inventions.

The drawings are only for the purpose of illustrating preferred and alternative examples of how the inventions can be made and used and are not to be construed as limiting the inventions to only the illustrated and described examples. The various advantages and features of the present inventions will be apparent from a consideration of the drawings in which.

DETAILED DESCRIPTION

Figure 1:
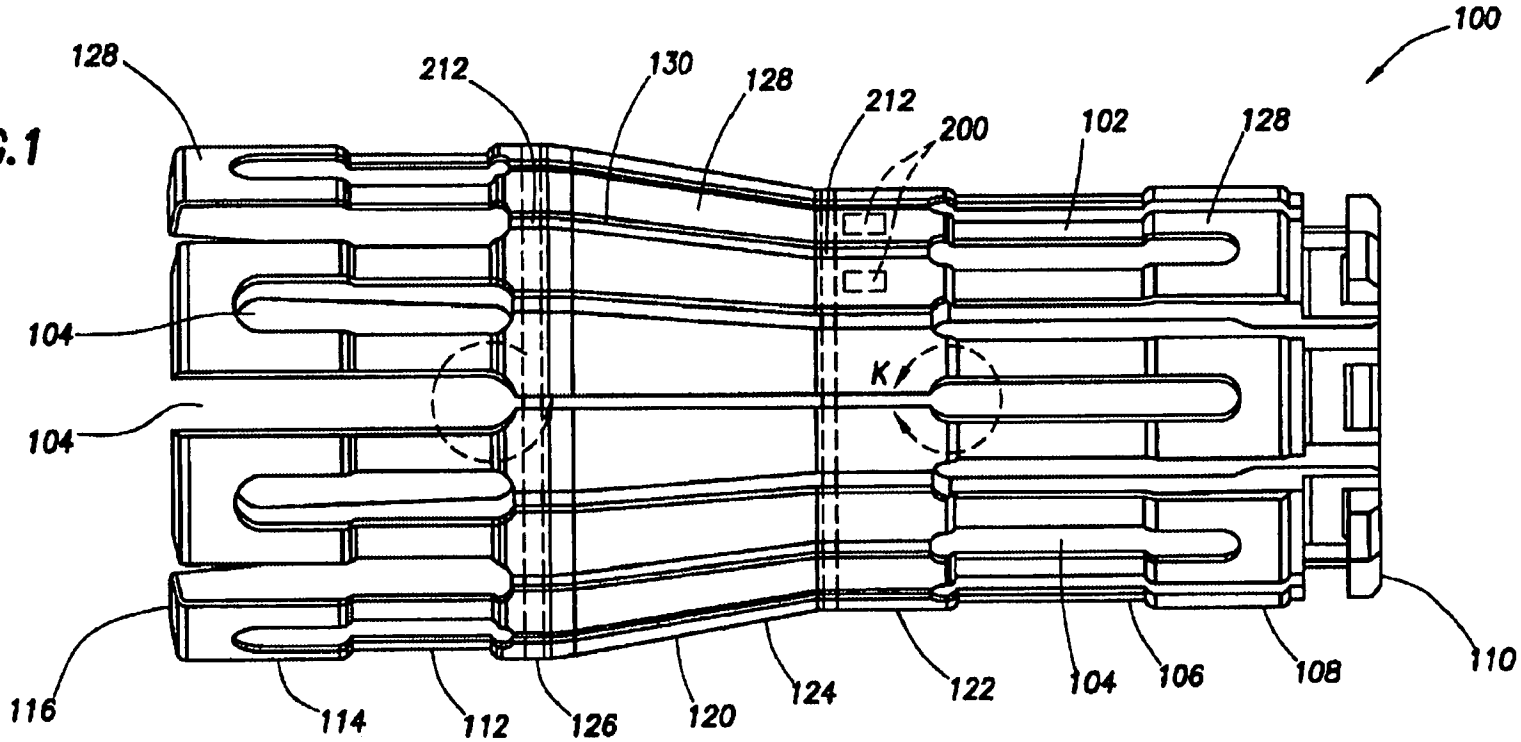
FIG. 1 is a side elevational view of a variable diameter expansion tool with hardened wear faces.

The present inventions are described by reference to drawings showing one or more examples of how the inventions can be made and used. In these drawings, reference characters are used throughout the several views to indicate like or corresponding parts. In the description which follows, like or corresponding parts are marked throughout the specification and drawings with the same reference numerals, respectively. The drawings are not necessarily to scale and the proportions of certain parts have been exaggerated to better illustrate details and features of the invention. In the following description, the terms "upper," "upward," "lower," "below, " "downhole," "longitudinally," and the like, as used herein, shall mean in relation to the bottom or furthest extent of, the surrounding wellbore even though the wellbore or portions of it may be deviated or horizontal. Correspondingly, the "transverse" orientation shall mean to orientation perpendicular to the longitudinal orientation. The term "sand-control" used herein means the exclusion of particles larger in cross section than a chosen size, whether sand, gravel, mineral, soil, organic matter, or a combination thereof. As used herein, "real-time" means less than an operationally significant delay but not necessarily simultaneously.

Apparatus and methods for constructing and deploying screen jackets are used in conjunction with the inventions, but are not critical thereto. Exemplary sand-control screens and methods of their deployment in a well are disclosed in U.S. Pat. Nos. 6,931,232 and 5,850,875, and application Ser. No. 09/627,196, all of which are assigned to the assignee of this application and are incorporated herein for all purposes by this reference.

Conventionally, a borehole is drilled into the earth intersecting a production zone. A well casing is typically installed in the borehole. A radially expandable screen jacket assembly may be inserted into the portion(s) of the borehole adjacent the production zones. The connection between the casing and the radially expandable screen jacket assembly may be made in the conventional manner. The wall of the wellbore is substantially cylindrical forming a substantially annular space, but typically has irregularities more or less randomly distributed throughout its length.

Generally, with the unexpanded screen jacket assembly inserted into the desired location of the wellbore in the conventional manner, an expansion tool is moved longitudinally through the screen jacket assembly causing it to radially expand to a larger diameter to substantially fill the annular space making contact with the wellbore wall. The particulars of the apparatus and methods are further set forth in the following description.

A flexible expansion tool for use to expand tubulars in a subterranean well is described with reference primarily to FIG. 1. the tool 100 has a cone 102 preferably made of 4140 steel, although other strong, ductile metallic or composite materials may be used. The cone 102 has expansion slots 104 arranged to facilitate radial flexibility. The expansion slots 104 are preferably arranged in a symmetrical pattern as shown in FIG. 1, but may be shaped differently or arranged asymmetrically. The cone 102 preferably has a forward portion 106 substantially cylindrical in shape. The forward portion 106 preferably has a raised section 108, preferably near its forwardmost end 110. An aft portion 112 of the cone 102 is also typically substantially cylindrical in shape and larger in overall diameter than the raised section 108 of the forward portion 106. The aft portion 112 also preferably has a raised section 114, typically near its aftmost end 116. Between the forward portion 106 and aft portion 112, a mid portion 120 is disposed. The mid portion 120 typically graduates from a first cylindrical portion 122, of the same outside diameter as the raised section 108 of the forward portion 106, to a frustum-shaped section 124, to a second cylindrical portion 126, of the same outside diameter as the raised section 114 of the aft portion 112. The exact configuration of the cone 102 is not crucial to the concept of the invention as long as the cone 102 is shaped in such a way as to forcibly cause a tubular to expand as the cone 102 is forcibly moved through the tubular.

Further referring primarily to FIG. 1, hardened wear faces 128 are preferably attached to the exterior of cone 102. Preferably the wear faces 128 cover the outer periphery of the mid portion 120 of the cone, and the raised sections fore 108 and aft 114. The wear faces 128 are preferably made from tool steel, D-2 steel, molybdenum disulphide, or tungsten carbide, although other hard, wear-resistant metals or composites may be used. The wear faces 128 are preferably laser welded to the underlying surface 130 of the cone 102. The wear faces may also be attached to the cone surface by other means such as chemical or mechanical bonding.

Figure 2:
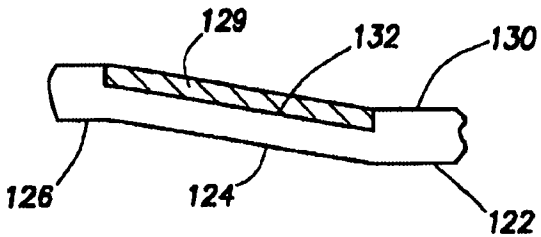
FIG. 2 is an elevational partial cross-sectional view of the expansion tool.

One example of an alternative attachment of the wear faces to the outer surface 130 of the cone 102 is shown in FIG. 2. Niches 132 are provided in the outer periphery of the cone 102 for receiving wear face inlays 129. Niches 132 and inlays 129 may extend the length of frustum-shaped section 124, as shown, or over any portion of the cone outer surface 130. The wear face inlays 129 are preferably laser welded in position, but may be attached by other means, such as chemical or mechanical bonding.

Figure 3:
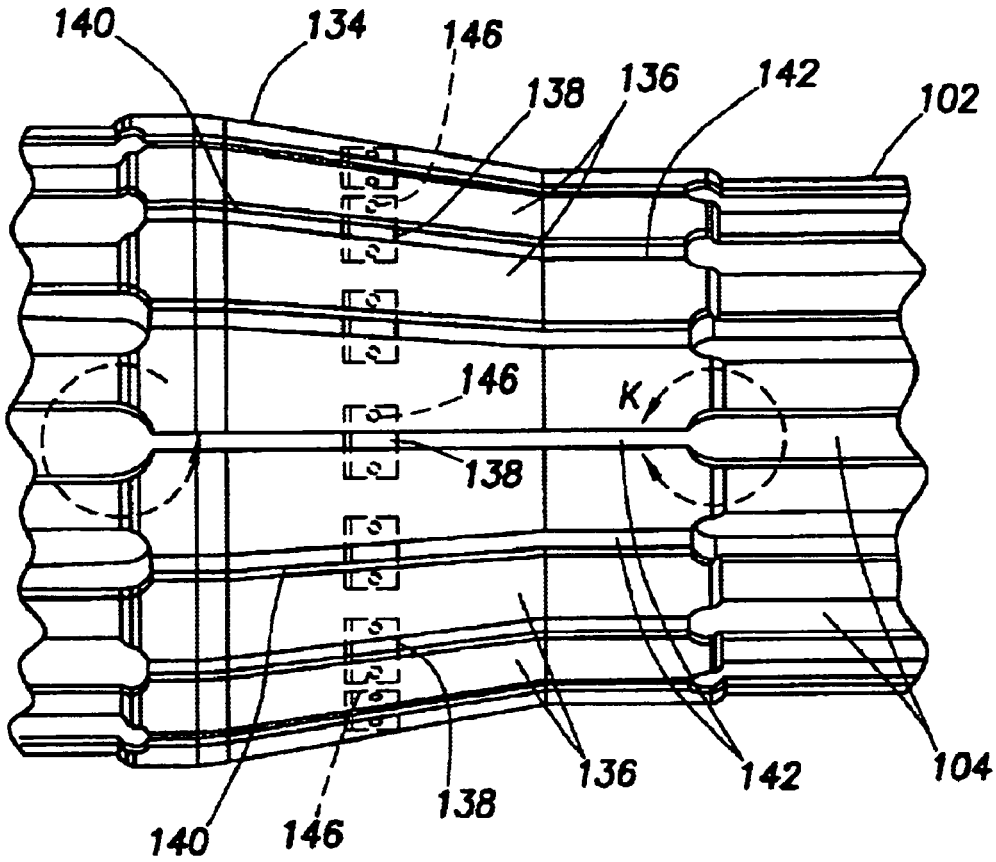
FIG. 3 is a partial elevational view of an embodiment of the tool.

An example of an alternative embodiment of wear faces and their attachment is shown in FIG. 3. The wear faces 128 are in the form of rings 134, preferably made up of segments 136 connected by connectors 138. The wear faces 128 are preferably floatingly attached to the cone 102 buy may be chemically or mechanically attached to the cone 102. The floating attachment 140 is designed to allow the cone 102 to flex independently of the wear faces 128. Preferably apertures 142 in the wear faces 128 are provided and align with corresponding expansion slots 104 in the cone 102. Fasteners 146, preferably countersunk pins or bolts, retain the wear faces 128 in position relative to the cone while allowing radially slidability. This floating attachment arrangement may be used with any of the embodiments described herein.

Figure 4:
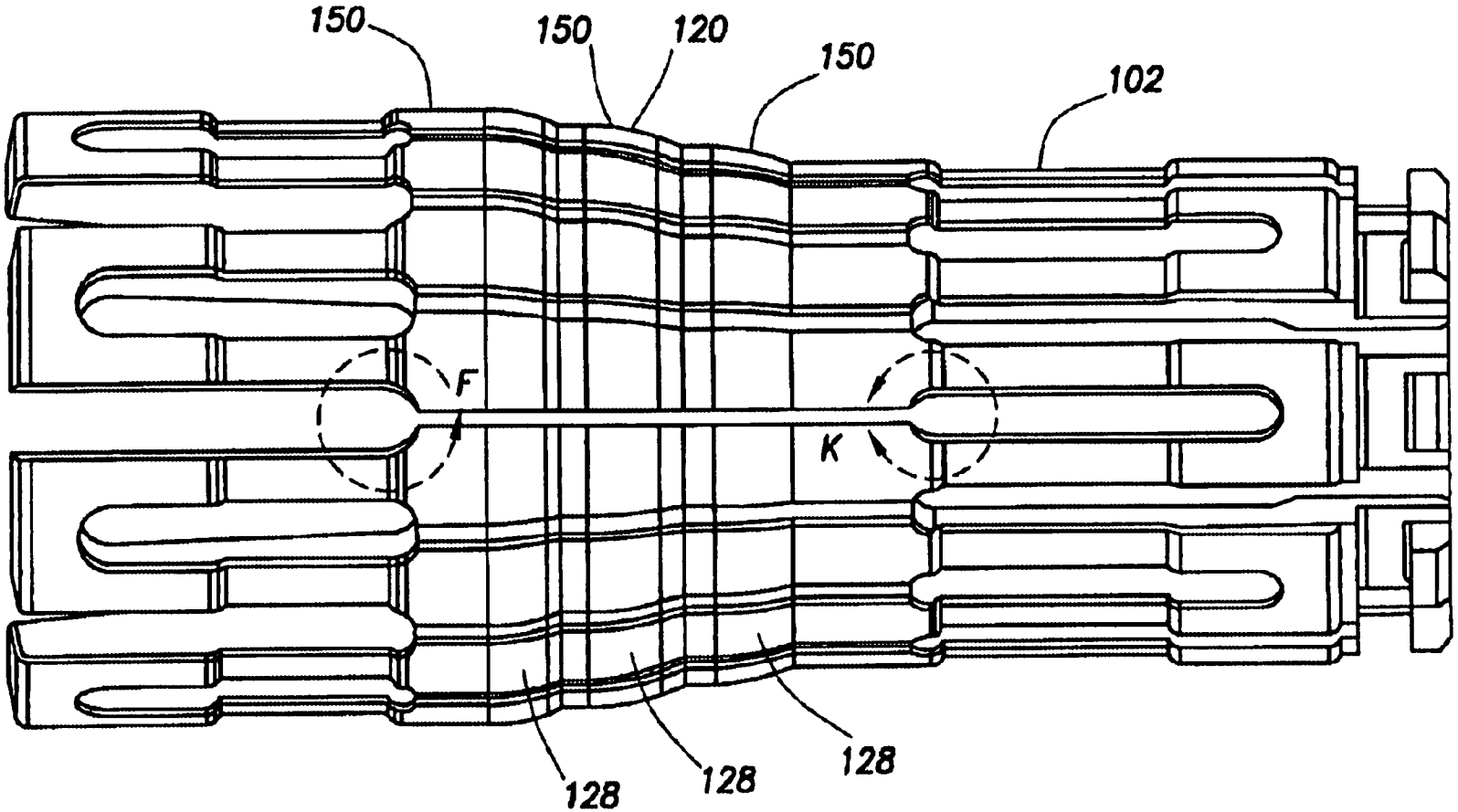
FIG. 4 is an elevational view of an embodiment of the tool.

FIG. 4 shows an alternate embodiment of cone 102 and wear faces 128. The mid-portion 120 of the cone 102 comprises multiple frusto-conical sections 150 each of which may employ separate wear faces 128. The number, placement and attachment means of the wear faces may vary.

Figure 5:
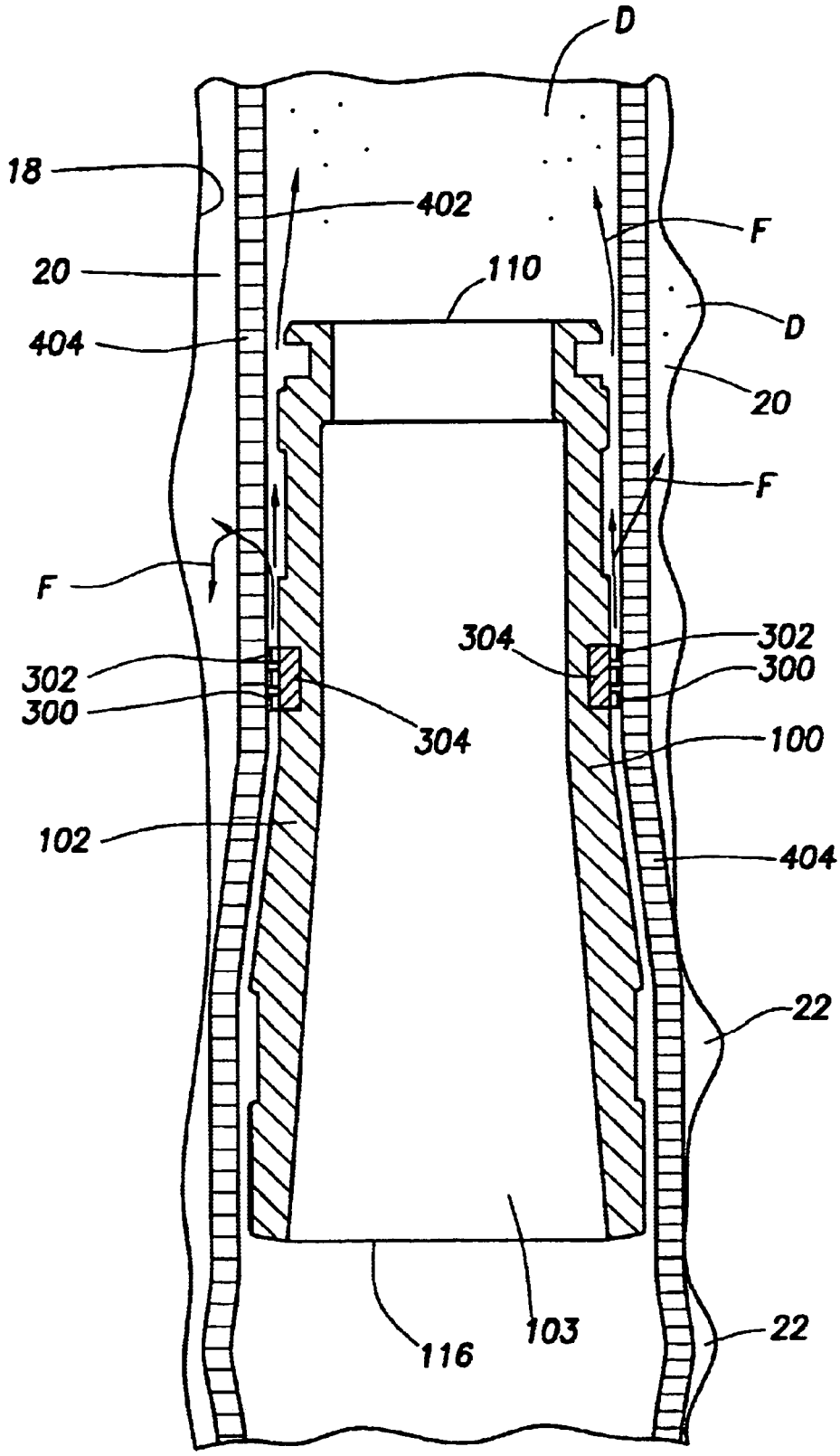
FIG. 5 is a cross-sectional view of a wellbore have the tool disposed therein.

The preferred method of practicing the invention is depicted with reference primarily to FIG. 5. The flexible expansion tool 100 is introduced into the interior of the expandable tubular 400 in well 12. The flexible expansion tool 100 may be reduced in diameter to facilitate its deployment. Once positioned, the tool 100 is actuated and the cone 102 is radially expanded so that the wear faces 128 contact the inner surface 402 of the unexpanded tubular 400. The expansion is continued, forcibly causing the unexpanded tubular 400 to permanently assume an expanded diameter. The tool 100 is forced axially along the tubular, expanding the tubular as it progresses along the tubular length. The tool 100 may be oriented to allow movement downhole or uphole, causing the radial expansion of the tubular 400 for any desired length. The tool 100 has the advantages of radial flexibility to facilitate contracting or expanding as conditions warrant. Further advantages in reduced friction and tool longevity are realized by the fact that the surfaces of the tool that come in contact with the tubular are lined with wear faces.

The expansion tool 100 may be variably expandable, that is, having a selectively variable diameter to allow the mandrel to reduce its diameter to successfully maneuver through areas of the wellbore having a smaller diameter, as shown in FIG. 4, or to enlarge its diameter to more completely expand a tubular, such as screen 400, thereby eliminating or reducing any pockets or gaps 22 between the expanded tubular 400 and the wellbore wall 18. The variations in diameter may be automatically controlled, such that the expansion tool 100 regulates its own diameter, based on well conditions as measured by sensors 200.

Variable expansion is accomplished via dilator 212, preferably mounted to the interior 103 surface of the cone 102. Multiple dilators may be employed at various locations on the cone. The dilator may be designed to operate within a preselected range of expansion force so that minimum wellbore contact stress is achieved. In operation, the dilator may control the diameter of the cone based on contact stress.

With reference primarily to FIG. 1, the variable diameter cone 102 has one or more sensors 200, preferably attached to the frustum section 120, for detecting one or more physical parameters germane to radial expansion of the tubular, and converting the physical parameters to one or more electronic signals. The sensors may measure contact stress, expansion and compression forces, axial force, downhole pressure, temperature and the like, and any other parameters as desired. Sensors 200 may also measure the diameter of the mandrel at any given point along the wellbore, thereby providing a means of mapping the diameter of the expanded tubular. A processor circuit is electrically connected to the sensors 200 for processing sensor signals. The processor circuit is preferably a commercially available multipurpose microprocessor such as those manufactured by MOTOROLA™ or INTEL™, may also be a more specialized ASIC. The processor circuit may be electrically associated with an electronic memory circuit and/or a transceiver circuit. Preferably, an electronic memory circuit is used to store date signals from the processor circuit and the transceiver circuit is used to send signals as they are generated, to an operator at the surface or to receive signals from the surface relating to control of the tool. A control circuit is electrically connected to the processor circuit. A dilator 212, preferably electromechanical, is in turn electrically connected to the control circuit. The dilator 212 is in mechanical contact with the cone 102, preferably within the interior 103.

In operation, the dilator 212 is used to exert a force extending radially through the cone 102. By increasing or relaxing this radial force, the diameter of the cone 102 can be expanded or contracted. By providing preprogrammed instructions to the processing circuit and/or the control circuit, the electronic signals obtained from the sensors 200 and/or signals from the surface can be used to automatically regulate the degree of expansion of the cone 102. For example, a digital signal processing circuit, wavelet analysis circuit, or neural network circuit, may be used to generate instructions to the control circuit, preferably in real-time response to sensor 200 signals.

Referring to FIG. 5, the cone 102 may have a seal 300. The seal 300 is a controlled-egress seal, preferably located at the forward end 110 of the cone 102. The seal 300 maintains sealing contact with the inner surface 402 of the tubular 400. The sealing contact is not fluid tight, but permits a controlled amount of fluid F to pass between the seal 300 and the inner surface 402 of the tubular 400. The seal 300 is preferably a labyrinth-type seal, which permits egress of a relatively small amount of well fluid F through the seal.

The labyrinth-type seal element 302 is advantageous in terms of decreased wear over an elastomeric seal. The labyrinth seal 3-2 also provides an advantage in directing fluid flow ahead of the tool 100, reducing the quantity of debris D in the wellbore and in annular space 20, that could otherwise become forced into openings 404 in the screen assembly 400 upon expansion. The seal element 302 is preferably made from stainless steel or composite material, but may be from any material suitably resistant to corrosion. The seal element 302 is typically attached to a seal carrier 304, which is in turn mechanically attached to the surface of the cone 102 such as by bolting or welding. The exact configuration of the labyrinth seal 300 is not critical to the invention. The seal may be designed to provide controlled fluid flow without physically contacting the tubular itself. The seal location on cone 102 may vary without departing from the spirit of the invention.

Figure 6:
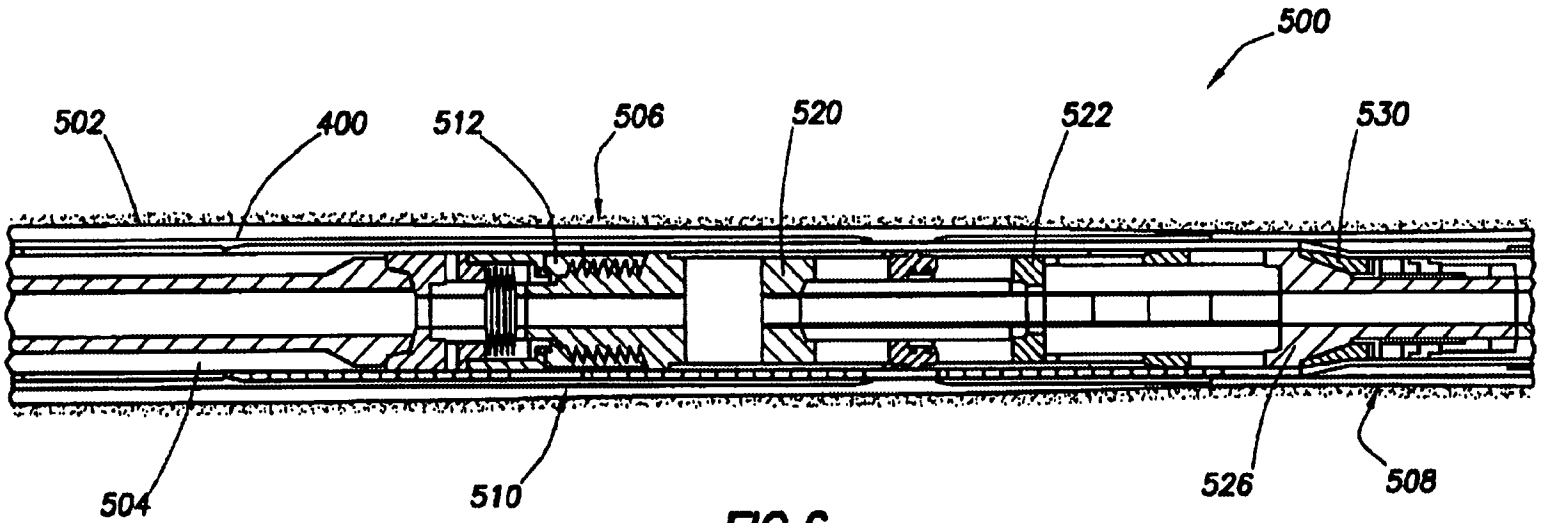
FIG. 6 is a cross-sectional view of a wellbore having an expansion tool assembly disposed therein.
Figure 7:
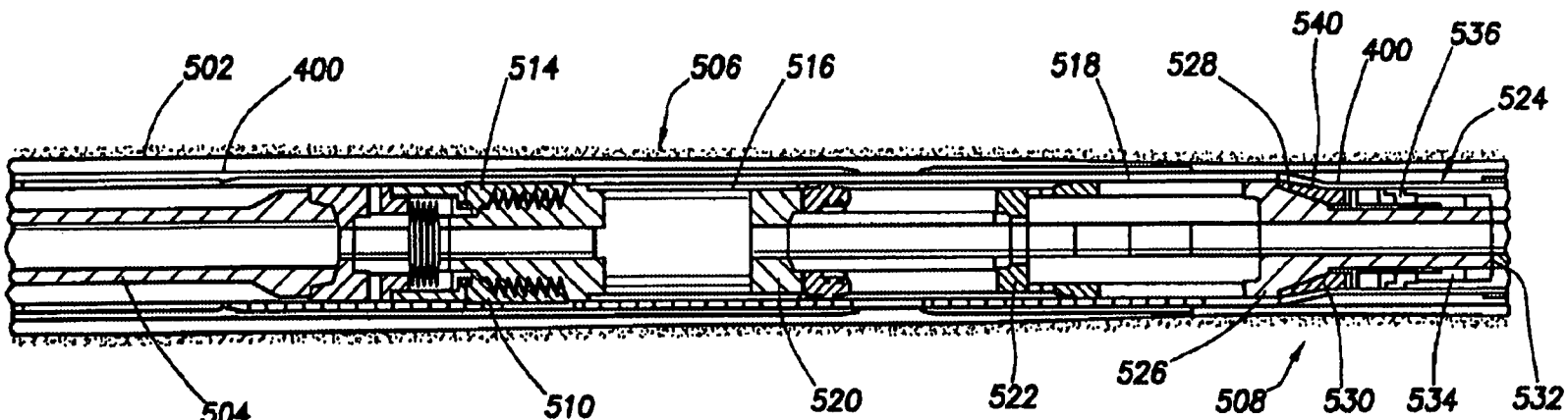
FIG. 7 is a cross-sectional view of a wellbore having an expansion tool assembly disposed therein.

Referring now to FIGS. 6 and 7, a screen expansion apparatus 500 is shown disposed in a wellbore 502, typically uncased, for expanding screen assembly 400. The screen expansion apparatus 500 is connected to tubing 504 in the conventional manner. Tubing 504 can be rolled tubing or jointed pipe string, and while the wellbore is illustrated in only one manner, it may be vertical, deviated or horizontal.

Screen expander 500 has an upper body 506 and lower body 508. The upper body 506 is provided with anchoring mechanism 510 movable between a retracted position 512, as shown in FIG. 6, and an extended position 514, as shown in FIG. 7. Anchoring mechanism may be of any type known in the art, such as slips, as shown, or a packer, and preferably operates from fluid pressure supplied through the tubing string 504. The anchoring mechanism may include multiple devices located at various locations along the length of the tool 500. In the retracted position 512, the slips do not interfere with movement of the screen expander apparatus 500 within the wellbore 502 or within the screen assembly 400. In the extended position 514, the slips engage the screen assembly wall or wellbore, thereby locking the upper body 506 of the screen expander 500 in place. Bleeding pressure from the tubing 504 will release the anchoring mechanism 510, as the anchoring mechanism 510 will return to the retracted position 512.

The upper body 506 further comprises a force generator 516. The force generator 516 may be of any kind known in the art and preferably is a hydraulic ram operated using fluid pressure supplied through tubing string 504. The force generator 516 preferably includes a force multiplier 518 such as the double-piston assembly, as shown. The force multiplier 518 has a primary 520 and a secondary 522 piston, operable as is known in the art. The force generator 516, or hydraulic ram, is operable to extend the lower body 508 of the expansion apparatus 500 relative to the upper body 506.

The lower body 508 supports expansion cone assembly 524 including mandrel 526 having a ramp 528 upon which cone 530 slides. The expansion cone assembly can be of any type known in the art, including the cones heretofore discussed. The expansion cone assembly 524 shown in FIGS. 6 and 7 operates on fluid pressure as supplied through the tubing 504. Pressure, supplied through port 532, drives cone piston 534 and internal slip 536 to move slidable cone 530 up ramp 528 of mandrel 526. When the cone is moved from its retracted position to its expanded position the cone can be used to expand the screen assembly 400 as the lower body 508 of the screen expansion apparatus 500 is extended.

In operation, the screen expansion device 500 is lowered into the wellbore 502 to a desired depth adjacent an unexpanded screen assembly 400. During the run-in procedure, the anchoring mechanism 510 and expansion cone 530 are in their retracted positions 512 and 538, respectively. The expansion cone 530 is moved to the expanded position 540 wherein the cone 530 contacts the screen assembly 400 thereby expanding the screen. The cone 530 is moved to its expanded state 540 by providing fluid pressure, via the tubing string 504, through ports 532 to drive cone piston 534 which in turn powers the cone 530 up ramp 528 of mandrel 526. Internal slip 536 is operable to maintain the cone's position and allow later retraction. Expansion of the cone 530 may involve setting the anchoring mechanism 510 and stroking the force generator 516, thereby extending lower body 508.

Once the expansion cone assembly 524 is in its expanded state, the screen assembly 400 may be radially expanded by the longitudinal advancement of the cone through the screen. The anchoring mechanism 510, such as the slips shown, are moved from the retracted position 512 to the extended position 514 to anchor the upper body 506 of the expansion apparatus 500 in the wellbore 502 or screen assembly 400. The force generator 516 is activated, extending the lower body 508 of the expansion apparatus 500 with respect to the upper body 506 and forcing the expansion cone 530 longitudinally through the screen 400, thereby expanding the screen.

After the force generator 516 is, preferably, fully extended, the anchoring mechanism 510 is retracted, by lowering the fluid pressure in the tubing. The cone 510, in contact with the screen assembly 400, now acts to anchor the lower body 508 of the expansion apparatus 500 with respect to the wellbore 502. The force generator is then retracted. As the force generator is retracted, the upper body 506 is pulled downhole towards the cone 530.

The process is repeated, creating an inch-worm effect while expanding the screen assembly. A similar method of inch-worming is described in U.S. Pat. No. 5,070,941 to Kilgore, which is incorporated herein by reference for all purposes. The method described herein may be used both for expansion of screen assemblies from the top-down or from the bottom-up.

Figure 8:
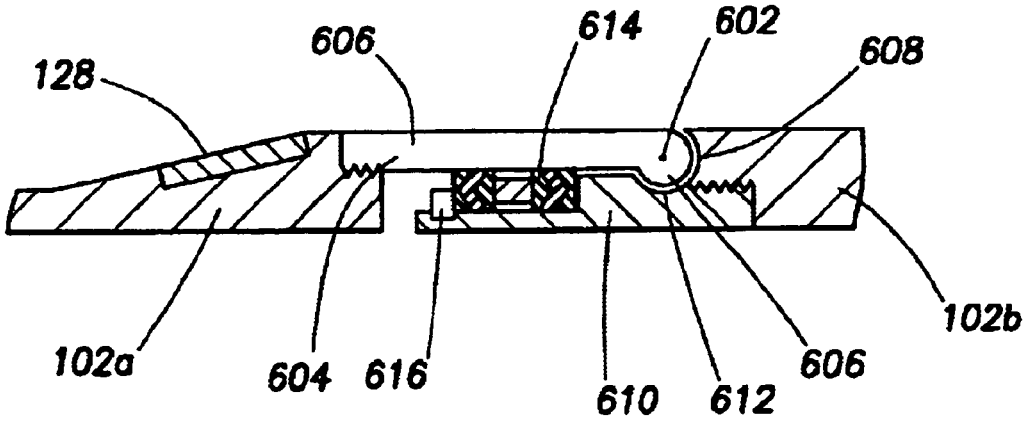
FIG. 8 is a partial cross-section of an embodiment of the tool.

Referring to FIG. 8, cone 102 can include joint assemblies 600 for added flexibility in the expandable cone. The increase in flexibility reduces the stress placed on the expandable tubular by the expansion cone. The knuckle joint assembly configuration can be repeated multiple times throughout the length of the expansion tool 100 and can be sued in conjunction with other tool features herein, such as a hardened wear face 128.

Joint assembly 600 is preferably a "knuckle joint" assembly, but can be other jointed or articulated assemblies as are known in the art. Knuckle joint 600 forms an articulating joint allowing one cone section 102a to move relative to another cone section 102b about a pivot point 602. Joint arm 604, having a pivot ball 606 of arm 604 attaches to cone section 102a, while the ball 606 of arm 604 mates with socket 608 which may be integral with cone section 102b as shown. Retaining arm 610 is attached to cone section 102b. Joint arm 604 is captured by recess 612 in the retaining arm 610. A flexible sealing element, such as packing 614, with vee-stop 616, seal the joint assembly 600 while allowing limited movement of joint arm 604 about the pivot joint. Use of multiple joint assemblies spaced along the length of cone 102 would allow for greater flexibility and can be added as desired.

The embodiments shown and described above are only exemplary. Many details are often found in the art such as screen or expansion cone configurations and materials. Therefore, many such details are neither shown nor described. It is not claimed that all of the details, parts, elements, or steps described and shown were invented herein. Even though, numerous characteristics and advantages of the present inventions have been set forth in the foregoing description, together with details of the structure and function of the inventions, the disclosure is illustrative only, and changes may be made in the detail, especially in matters of shape, size and arrangement of the parts within the principles of the inventions to the full extent indicated by the broad general meaning of the terms used in the attached claims.

The restrictive description and drawings of the specific examples above do not point out what an infringement of this patent would be, but are to provide at least one explanation of how to make and use the inventions. The limits of the inventions and the bounds of the patent protection are measured by and defined in the following.

What is claimed is:

1. An expansion cone apparatus for use in expanding a tubular in a subterranean well comprising:

a cone body;

and at least one wear face attached to the cone body, the wear face made of a material harder than the cone body *and comprising at least one ring including a plurality of wear face segments attached to one another by connectors*.

2. An expansion cone apparatus as in claim 1 wherein the cone body is 4140 steel.

3. An expansion cone apparatus as in claim 1 wherein the at least one wear face is tungsten carbide.

4. An expansion cone apparatus as in claim 1 wherein the at least one wear face is mechanically bonded to the cone body.

5. An expansion cone apparatus as in claim 1, the cone body having at least one niche therein for receiving the at least one wear face.

[6. An expansion cone apparatus as in claim 1 wherein the at least one wear face comprises at least one ring.]

[7. An expansion cone apparatus as in claim 6 wherein each ring comprises a plurality of wear face segments attached to one another by connectors.]

8. An expansion cone apparatus as in claim 1, the cone body having expansion slots therein.

9. An expansion cone apparatus as in claim 1 wherein the at least one wear face is floatingly attached to the cone body.

10. An expansion cone apparatus as in claim 1 wherein the expansion cone has an automatically-variable diameter, at least one sensor for detecting wellbore parameters operably connected to the variable diameter cone body whereby the cone body diameter automatically varies based on the detected parameters.

11. An expansion cone apparatus as in claim 1, the cone body having an exterior surface, a controlled egress seal on the exterior surface of the cone body for sealing contact with the tubular.

12. An expansion cone apparatus as in claim 1, the cone body having at least one pivotal joint assembly.

13. A method of downhole tubular expansion comprising of the steps of:

positioning an expansion cone in a tubular positioned in a subterranean wellbore, the expansion cone having a cone body and at least one wear face attached to the cone body, *the at least one wear face comprising at least one ring including a plurality of wear face segments attached to one another by connectors*, the at least one wear face of material harder than the cone body; *and* moving the expanded cone axially along the tubular thereby radially expanding the tubular.

14. A method of downhole tubular expansion as in claim 13 wherein the cone body is ductile material.

15. A method of downhole tubular expansion as in claim 13 wherein the at least one wear face is chemically bonded to the cone body.

16. A method of downhole tubular expansion as in claim 13 wherein the at least one wear face is mechanically bonded to the cone body.

17. A method of downhole tubular expansion as in claim 13, the cone body having at least one niche therein for receiving the at least one wear face.

[18. A method of downhole tubular expansion as in claim 13 wherein the at least one wear face comprises at least one ring.]

[19. A method of downhole tubular expansion as in claim 18 wherein each wear ring comprises a plurality of wear face segments attached to one another by connectors.]

20. A method of downhole tubular expansion as in claim 13, the cone body having expansion slots therein.

21. A method of downhole tubular expansion as in claim 13 wherein the at least one wear face is floatingly attached to the cone body.

22. A method of downhole tubular expansion as in claim 13 wherein the expansion cone has an automatically variable diameter, further comprising the step of automatically varying the diameter of the cone as it is moved along the tubular.

23. A method of downhole tubular expansion as in claim 13 the cone body having an exterior surface, a controlled egress seal on the exterior surface of the cone body for sealing contact with the tubular.

24. A method of downhole tubular expansion as in claim 13 the cone body having at least one pivotal joint assembly.

25. An expansion tool *apparatus* for use in expanding a tubular in a subterranean wellbore comprising:

an automatically variable diameter expansion [cone] *tool*; and at least one sensor for detecting parameters within the wellbore, the at least one sensor operably connected to the variable diameter expansion [cone] *tool*, the diameter of the expansion [cone] *tool* automatically varying based on the detected parameters.

26. An expansion tool as in claim [25] *87* further comprising at least one dilator operably connected to the expansion [cone] *tool* for expanding and contracting the expansion [cone] *tool*.

27. An expansion tool as in claim 26 wherein the expansion [cone] *tool* has an interior surface, the at least one dilator connected to the interior surface.

28. An expansion tool as in claim 27, the at least one dilator operable within a preselected range of expansion force.

29. An expansion tool as in claim 25 wherein the at least one sensor includes a contact stress sensor.

30. An expansion tool as in claim 26 wherein the at least one dilator is an electromechanical dilator.

31. An expansion tool as in claim [25] *87* wherein the expansion [cone] *tool* has expansion slots therein.

32. An expansion tool as in claim [25] *87* further comprising at least one wear face attached to the expansion [cone] *tool*.

33. An expansion tool as in claim [25] *87* further comprising a controlled egress seal on the expansion [cone] *tool* for sealing contact with the tubular.

34. An expansion tool as in claim [25] *87* further comprising at least one pivotal joint assembly.

35. A method of downhole tubular expansion, the tubular disposed in a wellbore of a subterranean well, comprising of the steps of:

positioning an automatically variable diameter expansion [cone] *tool* in the tubular;

expanding the [cone] *expansion tool* to a selected diameter;

advancing the [cone] *expansion tool* along the tubular, thereby radially expanding the tubular; and automatically varying the diameter of the [cone] *expansion tool* as the [cone] *expansion tool* is advanced along the tubular.

36. A method of downhole tubular expansion as in claim 35, further comprising the steps of:

detecting parameters within the wellbore; and varying the diameter of the [cone] *expansion tool* based on the detected parameters.

37. A method of downhole tubular expansion as in claim [35] *88*, wherein the expansion [cone] *expansion tool* includes at [lest] *least* one dilator for controlling the diameter of the [cone] *expansion tool*.

38. A method of downhole tubular expansion as in claim 37, the at least one dilator operable within a preselected range of expansion force.

39. A method of downhole tubular expansion as in claim 36, wherein the step of detecting includes detecting the contact stress of the [cone] *expansion tool*.

40. A method as in claim [35] *88*, the expansion [cone] *tool* having at least one wear face.

41. A method as in claim [35] *88*, the expansion [cone] *tool* having a controlled egress seal on the expansion [cone] *tool* for sealing contact with the tubular.

42. A method as in claim [35] *88*, the expansion [cone] *tool* having at least one pivotal joint assembly.

43. An expansion cone apparatus for use in expanding a tubular in a subterranean well comprising:

a cone body having an exterior surface; and a controlled egress seal on the exterior surface of the cone body for sealing contact with the tubular.

44. An expansion cone apparatus as in claim 43, the controlled egress seal being a labyrinthine seal.

45. An expansion cone apparatus as in claim 44 wherein the labyrinthine seal is of stainless steel.

46. An expansion cone apparatus as in claim 43, the controlled egress seal designed to direct fluid flow within a subterranean well.

47. An expansion cone apparatus as in claim 43 the cone body having a forward end, the controlled egress seal located at the forward end of the cone.

48. An expansion cone apparatus as in claim 43 wherein the sealing contact does not include physical contact between the tubular and the controlled egress seal.

49. An expansion cone apparatus as in claim 43 further comprising at least one wear face attached to the cone body.

50. An expansion cone apparatus as in claim 43 the diameter of the cone body is automatically variable.

51. An expansion cone apparatus as in claim 43 further comprising at least one pivotal joint assembly.

52. A method of tubular expansion, the tubular positioned in the wellbore of a subterranean well, comprising the steps of:

positioning an expansion cone in the tubular, the expansion cone having a cone body with an exterior surface and a controlled egress seal on the exterior surface for sealing contact with the tubular;

expanding the expansion cone; and moving the expanded cone axially along the tubular thereby expanding the tubular.

53. A method of tubular expansion, as in claim 52 wherein the controlled egress seal is a labyrinthine seal.

54. A method of tubular expansion, as in claim 53 wherein the seal is stainless steel.

55. A method of tubular expansion as in claim 52, wherein the controlled egress seal directs fluid flow within the wellbore ahead of the expansion cone apparatus as it is moved axially along the tubular.

56. A method of tubular expansion as in claim 52, the cone body having a forward end, wherein the controlled egress seal is on the forward end of the cone body.

57. A method of tubular expansion as in claim 52, wherein the sealing contact does not include physical contact between the tubular and the controlled egress seal.

58. A method as in claim 52, the cone body having at least one wear face attached thereto.

59. A method as in claim 52 wherein the diameter of the cone body is automatically variable, and further comprising the step of automatically varying the diameter of the cone body as it is moved along the tubular.

60. A method as in claim 52, the cone body further comprising at least one pivotal joint assembly.

61. A method of expanding a screen assembly in a subterranean wellbore, the method comprising the steps of:

1. positioning, adjacent the screen assembly, an expansion tool having an upper and lower body, an anchoring mechanism located in the upper body, an expansion cone assembly located in the lower body, and a force generator operable to vary the distance between the anchoring mechanism and the expansion assembly;
2. radially expanding the expansion assembly;
3. setting the anchoring mechanism;
4. activating the force generator to lengthen the distance between the anchoring mechanism and the expansion assembly, thereby forcing the expansion assembly through the screen assembly and radially expanding the screen assembly;
5. retracting the anchoring mechanism;
6. activating the force generator to shorten the distance between the anchoring mechanism and the expansion assembly; and
7. repeating steps 3-6 as desired.

62. A method of expanding a screen assembly as in claim 61 wherein the anchoring mechanism comprises a slip.

63. A method of expanding a screen assembly as in claim 62 wherein the anchoring mechanism further comprises a packer.

64. A method of expanding a screen assembly as in claim 61 wherein the force generator comprises a double-piston assembly.

65. A method of expanding a screen assembly as in claim 61 wherein the anchoring mechanism and force generator are operable via fluid pressure.

66. A method of expanding a screen assembly as in claim 61 wherein the screen expansion method is performed from the top down.

67. An expansion cone apparatus for use in expanding tubulars in a subterranean well comprising:

an expansion cone body having multiple cone sections; and at least one joint assembly pivotally connecting the cone sections.

68. An expansion cone apparatus as in *claim* 67 wherein the joint assembly is a knuckle joint.

69. An expansion cone apparatus as in *claim* 67, the expansion cone body having a length, wherein multiple joint assemblies are spaced along the length of the cone body.

70. An expansion cone apparatus as in *claim* 68, the expansion cone body having a length, wherein multiple joint assemblies are spaced along the length of the cone body.

71. An expansion cone apparatus as in *claim* 67 further comprising at least one wear face attached to the cone body.

72. An expansion cone apparatus as in *claim* 71 wherein the at least one wear face comprises at least one wear ring.

73. An expansion cone apparatus as in *claim* 67, the expansion cone body having expansion slots therein.

74. An expansion cone apparatus as in *claim* 67 wherein the diameter of the expansion cone body is automatically variable.

75. An expansion cone apparatus as in *claim* 69 wherein the diameter of the expansion cone body is automatically variable.

76. An expansion cone apparatus as in *claim* 67, further comprising a controlled egress seal mounted on the exterior surface of the cone body.

77. A method of tubular expansion, the tubular positioned in the wellbore of a subterranean well, comprising the steps of:

positioning an expansion cone in the tubular, the expansion cone having an expansion cone body with multiple cone body sections and at least one joint assembly pivotally connecting the cone sections;

expanding the expansion cone; and moving the expanded cone axially along the tubular thereby radially expanding the tubular.

78. A method as in claim 77 wherein the at least one joint assembly is a knuckle joint.

79. A method as in claim 77, the expansion cone body having a length, wherein multiple joint assemblies are spaced along the length of the cone body.

80. A method as in *claim* 78, the expansion cone body having a length, wherein multiple joint assemblies are spaced along the length of the cone body.

81. A method as in *claim* 77 the expansion cone further comprising at least one wear face attached to the cone body.

82. A method as in *claim* 81 wherein the at least one wear face comprises at least one wear ring.

83. A method as in *claim* 77, the expansion cone body having expansion slots therein.

84. A method as in *claim* 77, the diameter of the expansion cone body being automatically variable, and further comprising the step of automatically varying the diameter of the expansion cone.

85. A method as in *claim* 79, the diameter of the expansion cone body being automatically variable, and further comprising the step of automatically varying the diameter of the expansion cone.

86. A method as in *claim* 77, the expansion cone further comprising a controlled egress seal mounted on the exterior surface of the cone body.

*87. An expansion tool apparatus as in claim 25 wherein the expansion tool comprises an expansion cone.*

*88. A method of downhole tubular expansion as in claim 35, wherein the expansion tool comprises an expansion cone.*

*89. A method of utilizing an expansion tool in conjunction with a sensor in a wellbore, comprising:*

*running the expansion tool in an expandable tubular in the wellbore;*

*positioning the sensor proximate the expansion tool;*

*activating the expansion tool in order to expand the expandable tubular; and*

*operating the sensor to detect at least one parameter in the wellbore.*

*90. The method of claim 89, wherein the at least one parameter comprises temperature.*

*91. The method of claim 89, wherein the at least one parameter comprises expansion force.*

*92. The method of claim 89, wherein the at least one parameter comprises compression force.*

*93. The method of claim 89, wherein the at least one parameter comprises pressure.*

*94. The method of claim 89, wherein the at least one parameter comprises contact stress.*

*95. The method of claim 89, wherein the at least one parameter comprises diameter of the expansion tool.*

*96. The method of claim 95, further comprising mapping the diameter of the expanded tubular.*

*97. The method of claim 89, further comprising controlling the diameter of the expansion tool in response to one of the at least one parameters.*

*98. An expansion tool for expanding a tubular in a wellbore, comprising:*

*an expansion member capable of being actuated outwardly when expansion of the tubular is desired; and*

*at least one sensor operably coupled to the expansion member for sensing a wellbore parameter.*

*99. The expansion tool of claim 98, wherein one of the at least one sensor comprises a sensor sensing temperature.*

*100. The expansion tool of claim 98, wherein one of the at least one sensor comprises a sensor sensing expansion force.*

*101. The expansion tool of claim 98, wherein one of the at least one sensor comprises a sensor sensing compression force.*

*102. The expansion tool of claim 98, wherein one of the at least one sensor comprises a sensor sensing pressure.*

*103. The expansion tool of claim 98, wherein one of the at least one sensor comprises a sensor sensing contact stress.*

*104. The expansion tool of claim 98, wherein one of the at least one sensor comprises a sensor sensing diameter of the expansion member.*

*105. The expansion tool of claim 98, wherein the expansion member is automatically actuated outwardly based on an input from the at least one sensor.*

*106. The expansion tool of claim 98, wherein the expansion member is capable of being actuated radially outwardly when expansion of the tubular is desired.*

*107. The expansion tool of claim 98, wherein the sensor is affixed to the expansion member.*

*108. An expansion cone apparatus for use in expanding a tubular in a subterranean well comprising:*

*an automatically-variable diameter cone body;*

*at least one wear face attached to the cone body, the wear face made of a material harder than the cone body; and*

*at least one sensor for detecting wellbore parameters operably connected to the variable diameter cone body, whereby the cone body diameter automatically varies based on the detected parameters.*

*109. An expansion cone apparatus for use in expanding a tubular in a subterranean well comprising:*

*a cone body having an exterior surface, the cone body comprising a controlled egress seal on the exterior surface for sealing contact with the tubular; and*

*at least one wear face attached to the cone body, the wear face made of a material harder than the cone body.*

*110. A method of downhole tubular expansion comprising of the steps of:*

*positioning an expansion cone in a tubular positioned in a subterranean wellbore, the expansion cone having a cone body and at least one wear face chemically bonded to the cone body, the at least one wear face of material harder than the cone body; and*

*moving the expanded cone axially along the tubular thereby radially expanding the tubular.*

*111. A method of downhole tubular expansion comprising of the steps of:*

*positioning an expansion cone in a tubular positioned in a subterranean wellbore, the expansion cone having a variable diameter cone body and at least one wear face attached to the cone body, the at least one wear face of material harder than the cone body;*

*moving the expanded cone axially along the tubular thereby radially expanding the tubular; and*

*automatically varying the diameter of the cone as it is moved along the tubular.*

* * * * *